July 9, 1935.  E. PETTAZZONI  2,007,725
BICYCLE
Filed April 23, 1934
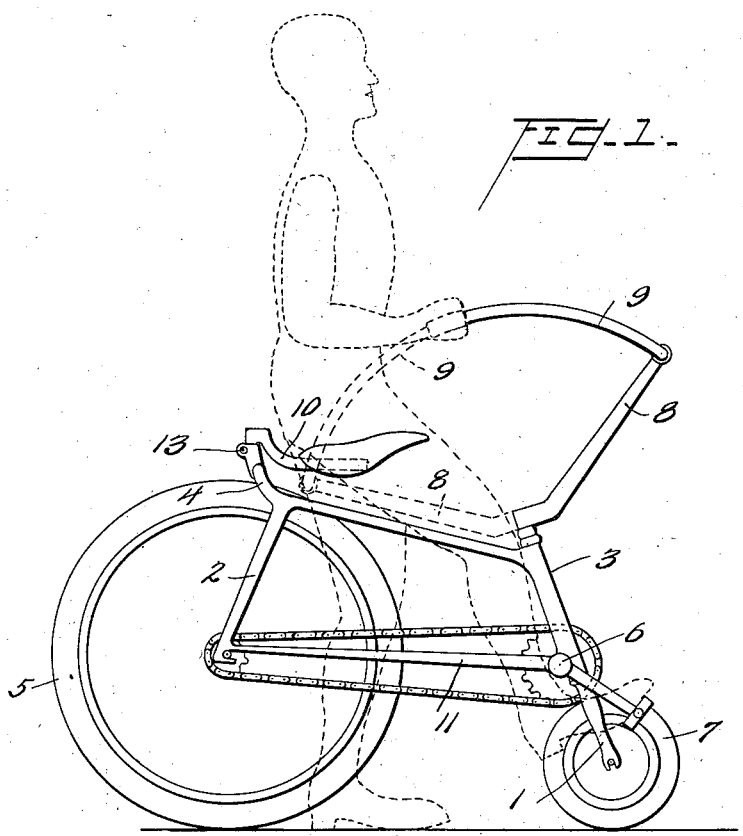
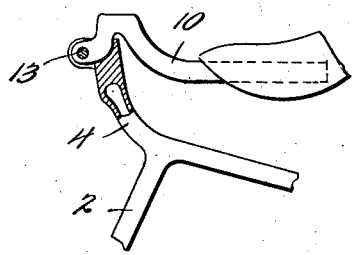

Patented July 9, 1935

2,007,725

UNITED STATES PATENT OFFICE 2,007,725

BICYCLE

Ernesto Pettazzoni, Bologna, Italy

Application April 23, 1934, Serial No. 721,995
In Great Britain April 11, 1933

1 Claim. (Cl. 208—93)

The present invention relates to a bicycle of the type having a front wheel of considerably smaller diameter than that of the rear wheel. The invention consists primarily in providing a bicycle of this type with reversible handle bar which in the reversed position is located partly under the rider's body.

Another feature of the invention is the fact that the pedal shaft is arranged at the point of junction of a lower fork with a front tube, so that the perpendicular line drawn through the centre of the crank shaft passes through the small front wheel, this arrangement resulting in the rider's feet moving forwardly beyond the small front wheel. Another feature of the invention is the fact that the top portion of the upper member of the frame is provided with a slot through which the rear wheel projects upwardly. This arrangement enables the saddle to be brought down very close to the rear wheel.

A further feature of the invention resides in the novel mounting of the saddle post to the upper frame member whereby it can be lifted for the purpose of reversing the position of the handle bars, thus providing clearance, and then can be returned to position without the use of tools. The form of saddle pin used is such that the saddle fits down closely over the rear wheel which protrudes through a slot in the upper frame member.

The accompanying drawing shows by way of example one construction embodying the features of the invention.

Fig. 1 is an elevation showing in full line the handle bar in its normal position and the saddle in its lowest position, the bicycle being in this condition suitable for use by a person of smaller than average height and showing the handle bars in dotted lines reversed for use by taller persons.

Fig. 2 is an enlarged fragmentary view, partially in section, of the saddle mounting.

The bicycle frame comprises a lower fork 1 for the small front wheel, an upper fork 2 for the rear wheel, an elongated front tube 3 for the reception of the steering rod, an upper member 4, connecting the tube 3 with the fork 2, and a lower member 11 connecting the lower ends of 2 and 3. 5 is the large rear wheel and 7 is the small front wheel. The upper frame member 4 has at the upper end below the saddle a slot through which the rear wheel projects upwardly. The pedal shaft 6 is placed at the point of junction of the fork 1 with the tube 3 so that a perpendicular line through the centre of the pedal shaft cuts the small front wheel 7. The handle bar is pivoted at the upper end of tube 3 and comprises a member 8 and two arms 9 forming substantially a semicircle, bearing at their ends the handles. It will be seen that the construction of the handle bar 8, 9 is such that when the bar is turned through an angle of 180° from the position shown in full lines into the position shown in dotted lines in Fig. 1, the handles will remain substantially in the same position, whilst the portion 8 of the handle bar will be located between and under the thighs of the rider. It may be particularly pointed out that the handle bar is supported by a single member 8 which joins it directly to the front steering gear within the tube 3.

If the cycle is to be used by a person of less than average height, a saddle pin 10 of the kind shown in Figs. 1 and 2 is used which enables the saddle to be lowered very close to the wheel. For use by a person of more than average height, a saddle pin of a different kind may be used and the handle bar is preferably employed in its reverse position.

The handle bars may be used in the dotted line position as shown in Figure 1 in which case the saddle must be swung out of the way during the operation of so positioning them. This is accomplished by having a pivot 13 at the upper end of the single rear portion of the member 4—4' to which the saddle pin 10 is pivoted as shown. The curvature of the pin 10 brings the saddle down close over the wheel but does not interfere with the operation of the handle bars in the dotted line position.

The advantages of the invention are its adaptability for use by persons of different stature, and the possibility of using the handle bar in two different positions, the normal position shown in Fig. 1 being particularly suitable for placing baggage or other packages within the handle bar and the reverse position assuring comfort and hygienic position of the rider, also easy defence in case of attack.

It will be understood that changing the position of the handle bar may be an advantage on long trips, as it enables the rider also to change the position of his arms to a certain extent. The whole vehicle is very rigid, inasmuch as the steering pillar is practically in a line with the front fork. The cycle may be easily stopped by putting one foot upon the ground. The risk of mud being thrown up by front wheel is reduced.

Having now particularly described and ascertained the nature of my said invention and in what manner the same is to be performed, I declare that what I claim is:

In a bicycle having a large rear wheel and small front wheel, a front tube, a substantially horizontal fork connecting the rear wheel and tube, a rearwardly and upwardly extending member attached to the upper end of said tube and having a slot therein near its rear end for the rear wheel, and a fork connecting said member and the rear end of the horizontal fork, said member rearwardly of said slot having a single upwardly extending post thereon, a pivot at the upper end of said post, a saddle pin mounted on said pivot for normally extending forwardly from the post, said pin curving downwardly above said slot to position the seat closely adjacent said wheel.

ERNESTO PETTAZZONI.